UNITED STATES PATENT OFFICE.

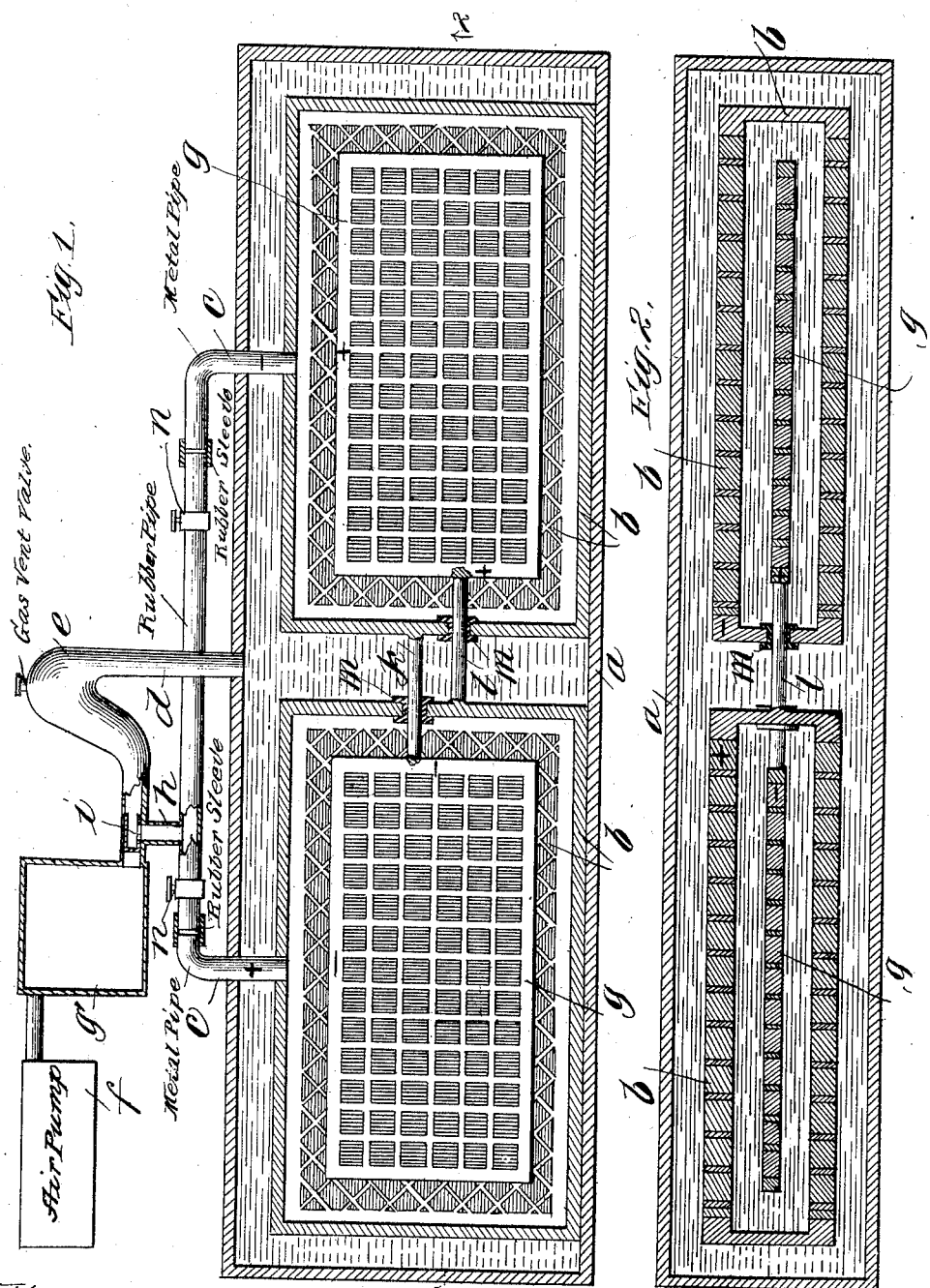

EDWARD SOKAL, OF CHICAGO, ILLINOIS.

STORAGE BATTERY.

1,034,157.

Specification of Letters Patent.   Patented July 30, 1912.

Application filed July 2, 1909.   Serial No. 505,572.

*To all whom it may concern:*

Be it known that I, EDWARD SOKAL, citizen of Austria, residing at Chicago, in the county of Cook and State of Illinois, United States of America, have invented a certain new and useful Improvement in Storage Batteries, of which the following is a full, clear, concise, and exact description, reference being had to the accompanying drawings, forming a part of this specification.

My invention relates to storage batteries, and particularly to that class of storage batteries in which the electrolyte has forced circulation through the active material of the electrode, such, for example, as the storage batteries set forth in my Patent No. 852,464, dated May 7, 1907.

In practising my invention, I employ hollow electrode structures, which are immersed in a bath of electrolyte and which hold electrolyte, pressure being exerted upon the electrolyte in the hollow electrode structures for purposes which are now well understood by those skilled in the art. Hitherto there has been no appreciable electrolytic action on the internal parts of the hollow electrode structure. By means of my invention, I cause electrolytic action to occur within the hollow electrode structures on internal parts of the hollow electrode structures.

Another feature of my present invention relates to the means for governing the forced circulation of the electrolyte. In practising this feature of my invention, I cause pressure intermittently to be exerted upon the electrolyte within the hollow electrode structures, and cause the intermittent return of such electrolyte to the hollow electrode structures, automatically operating valving mechanism being employed to shut off the return of the electrolyte to the hollow electrode structures when pressure is being exerted upon the electrolyte within the hollow electrode structures and to establish communication that will permit of the return of the electrolyte to the hollow electrode structures when pressure upon the electrolyte within the hollow electrode structures is removed. By this means periods of rest intervene between periods of forced circulation of the electrolyte through the active material of the electrodes, thereby greatly improving the operation of the battery.

I will explain my invention more fully by a description of one of many embodiments thereof which may be devised, by reference to the accompanying drawing, in which—

Figure 1 shows, somewhat diagrammatically, a storage battery equipment constructed and arranged in accordance with the invention, parts being illustrated in sectional elevation. Fig. 2 is a sectional bottom view on line 2 2 of Fig. 1.

Like parts are indicated by similar characters of reference in both figures.

I employ a container $a$ for holding the electrolyte and inclosing the hollow electrode structures, which container is made of some suitable material, which should be of an insulating nature if the hollow electrode structures rest directly thereupon, or which may be of metal if the hollow electrode structures and other parts are insulated therefrom. In the arrangement shown, the container $a$ is made of insulating material. The container is preferably hermetically sealed, except for piped in-let and out-let openings to be mentioned.

I have illustrated two hollow electrode structures $b$, desirably oblong in cross-section and whose broad vertical sides are of grid formation, both of said broad sides desirably entering into the construction of one electrode, on which account these broad sides are similar in construction and function. The hollow electrode structures $b$ have in-lets $c$, through which air pressure may be exerted upon the electrolyte within such electrodes to force the electrolyte through the pores of the active material in the grid walls thereof, the electrolyte within the chamber $a$ and surrounding the hollow electrodes being forced through the outlet $d$ into a trap $e$, as a consequence. Air is desirably supplied through the in-let $c$ at intervals of two or three minutes, the periods of pressure also lasting two or three minutes, on which account I employ an intermittently operating air pump $f$ leading to a central air drum or reservoir $g'$, that communicates with the main out-let pipe $h$ with which the pipes $c$ communicate. The drum $g$ may be in communication with a number of main out-lets $h$ for the purpose of supplying a number of battery system units.

Any suitable form of automatically operating valve, such as the cylindrical valve $i$, may be employed for cutting off communication between the trap $e$ and the in-lets $c$ and $h$ during the time that air is being forced through said in-lets, and to open up communication between the trap $e$ and said in-lets when the air pressure is removed, in order that the electrolyte forced within the trap $e$ during the presence of pressure upon the electrolyte within the hollow electrode structures may return to the hollow electrode structures. It will be understood that when the pump is in operation, the valve $i$ is moved to the right to cut off communication between the pipe $d$ and the pipe $h$ and to permit the air under pressure from the pump to effect circulating pressure upon the electrolyte within the hollow electrode structures. When the pump ceases operation, pressure of air upon the valve $i$ is removed, whereupon the pressure of the electrolyte rising within the tube $d$ is exerted upon said valve to move it to the left to reëstablish communication between the pipes $d$ and $h$, permitting the electrolyte to fall back within the hollow electrode structures.

Inasmuch as both broad sides of each hollow electrode structure are preferably similar in construction and function, there is no material electrolytic action between the same, and in order that the interior surfaces or portions of these broad sides may within the hollow electrode structures, take part in electrolytic action, I supply a complemental electrode element $g$ within each hollow electrode structure. Thus the broad sides of each hollow electrode structure constitutes one electrode, which sides coöperate with the complemental electrode $g$ interposed therebetween and with the electrolyte surrounding the complemental electrode $g$ in causing electrolytic action on surfaces or portions exposed to the electrolyte within the hollow electrode structure.

I have not deemed it essential to describe materials that enter into electrodes $b$ and $g$, as it will be well known to those skilled in the art how to select and construct these elements.

It is obvious that the outer electrodes $b$ may be formed each in two parts, as for example two halves, whose meeting faces are vertical and in the same plane with the axes of the sleeves $m$, these meeting faces, which are of storage battery metallic lead, being burned together in accordance with well known storage battery practice after the inner electrode has been disposed therein and the stem $k$ or $l$ has been passed through the sleeve $m$ which is positioned in recesses in halves of the end wall through which such stem projects. The stem, after having been projected through such sleeve, is burned to the outer electrode adjacent to the outer electrode through which such stem passes. No insulating and supporting pieces are illustrated as holding the inner electrodes in position, since the stems $k$ $l$ may be relied upon for this purpose, and particularly are the supporting and distance pieces omitted from the drawings, inasmuch as they would tend to render obscure the essential features of the invention, but it is of course understood that they may be supplied if desired. Separating devices and supporting devices are so well known in storage battery practice that their use in this structure, somewhat diagrammatically illustrated in the drawing, will be well understood by those skilled in the art.

I have indicated a conducting link $k$, preferably of lead, which electrically unites the left-hand electrode $g$ and the right-hand electrode $b$, and another such link $l$, which unites the left-hand electrode $b$ with the right-hand electrode $g$. These conducting links $k$ and $l$ pass through insulating sleeves $m$ in the walls of the electrodes $b$, the fit between the insulating sleeves $m$ and the links $k$ and $l$ being sufficiently tight to prevent pressure from forcing electrolyte through the sleeves.

If desired, some suitable means may be employed for regulating the relative pressures exerted upon the electrolyte within the hollow electrodes $b$, there being illustrated pipe-clamps for compressing the rubber portions of the in-lets $c$ for the purpose. This feature of my invention is of particular importance in view of the fact that the active material entering into the construction of the positive and negative electrodes present differing degrees of permeability to the flow of electrolyte therethrough.

While I have shown hollow electrodes of oblong shape, I do not wish to be limited to such a construction in all embodiments of the invention. In my co-pending application Serial No. 505,571 filed July 2, 1909 I have disclosed equipment having some features in common with the equipment herein disclosed.

It is very obvious that many changes may be made in the form of the invention herein shown and particularly described, without departing from the spirit of the invention, and I do not, therefore, wish to be limited to the precise construction shown, but,

Having thus described my invention, I claim as new and desire to secure by Letters Patent the following:—

1. A storage battery including a plurality of hollow electrodes, each containing electrolyte and a complemental electrode, each hollow electrode being directly connected with an inner electrode inclosed by another hollow electrode, and means for forcing the electrolyte through the pores of the active material of the hollow electrodes.

2. A storage battery including a hollow electrode structure subject to the action of an electrolyte, a container for said hollow electrode structure, a complementary electrode, means operating to effect intermittent forced circulation of said electrolyte through the pores of the active material and occasioning the passage of electrolyte from the container to the hollow electrode, and means operating to prevent the return passage of electrolyte from the hollow electrode structure to the container when circulation of the electrolyte is being forced and permitting the passage of the electrolyte from the container to the hollow electrode structure when circulation of the electrolyte is not being forced.

3. A storage battery including a plurality of hollow electrodes, each containing an electrolyte and a complemental electrode, each hollow electrode being directly connected with an inner electrode inclosed by another hollow electrode, and a circulating system for forcing the electrolyte through the pores of the active material of the hollow electrodes, said circulating system including the hollow electrodes.

4. A storage battery including a hollow electrode structure subject to the action of an electrolyte, a container for said hollow electrode structure, a complementary electrode, means operating to effect intermittent forced circulation of said electrolyte through the pores of the active material and occasioning discharge of electrolyte from the container, means for conveying the discharged electrolyte to the hollow electrode structure, and means operating to prevent return of the discharged electrolyte when circulation of the electrolyte is being forced and permitting the return of the discharged electrolyte to the hollow electrode structure when circulation of the electrolyte is not being forced.

In witness whereof, I hereunto subscribe my name this 29th day of June A. D., 1909.

EDWARD SOKAL.

Witnesses:
 G. L. Cragg,
 L. G. Stroh.